US006254011B1

(12) United States Patent
Kelly et al.

(10) Patent No.: US 6,254,011 B1
(45) Date of Patent: Jul. 3, 2001

(54) NON-LINEAR POTENTIOMETER HEATER CONTROL

(75) Inventors: Andrew Wayne Kelly, Sherrill, IA (US); Nicholas Edward Bollweg, Galena, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/545,914

(22) Filed: Apr. 10, 2000

(51) Int. Cl.[7] ..................................................... B60H 1/02
(52) U.S. Cl. .................. 237/12.3 R; 237/12.3 B
(58) Field of Search ................ 237/12.3 B, 12.3 R; 165/42, 43; 236/78 C, 78 D

(56) References Cited

U.S. PATENT DOCUMENTS

| 1,753,382 | * | 4/1930 | MacLeod | 237/12.3 B |
| 1,772,341 | * | 8/1930 | De Long | 237/12.3 B |
| 4,352,452 | * | 10/1982 | Shimada et al. | 236/13 |
| 5,226,595 | * | 7/1993 | Devera et al. | 237/2 A |
| 5,538,472 | * | 7/1996 | Panoushek et al. | 460/119 |
| 5,993,312 | * | 11/1999 | Panoushek et al. | 460/1 |

\* cited by examiner

Primary Examiner—Harold Joyce
Assistant Examiner—Derek Boles

(57) ABSTRACT

A vehicle is provided with an operators cab having a heating system. The vehicle is powered by an internal combustion engine that is a source of heated fluid. Heated fluid from the engine is directed to a supply line where it is carried to a heat exchanger in communication with the interior of the operators cab. A valve having an electrical actuator regulates the flow of heated fluid through the supply line to the heat exchanger. A non-linear potentiometer controls the actuator so that the heat output of the heat exchanger is linear with respect to the operation of the control knob. The non-linear potentiometer drives the actuator so that the valve is opened at an increasing rate until it its fully opened.

10 Claims, 2 Drawing Sheets

NON-LINEAR POTENTIOMETER HEATER CONTROL

BACKGROUND OF THE INVENTION

1. Field of the Invention

The invention is directed to using an operator controlled non-linear potentiometer to adjust a valve regulating the flow of heated fluid to an operator cab of a vehicle.

2. Description of the Prior Art

Vehicles are provided with operator cabs for housing the operator controlling the vehicle. The operator cab is typically provided with a heating system so the vehicle can be operated in cold conditions. The vehicle is powered by an internal combustion engine. A portion of the heat created by the combustion process is used to heat a fluid that is directed through a supply line to a heat exchanger in communication with the interior of the operator cab. To control the heat output of the heat exchanger, a valve is positioned in the supply line to regulate the flow of heated fluid to the heat exchanger. In the past, these valves have been controlled by an electrical actuator. The electrical actuator in turn is electrically coupled to a conventional rotary potentiometer. The operator by adjusts the flow of heated fluid to the heat exchanger by rotating the potentiometer to a selected heating position. In this design the position of the potentiometer is directly related to the position of the valve regulating the flow of hearted fluid. For example, if the rotary potentiometer is rotated through ten percent of its control arc the valve would be opened ten percent. However valve position is not proportional to heat output at the heat exchanger in the operator cab. For example it has been found that if a conventional potentiometer had a 270 degree control arc the heat output would max out at approximately 120 degrees of rotation. Therefore the operator's effective control of the heat output in the cab would be limited to the first 120 degrees.

To overcome this problem some vehicles are provided with automatic temperature control systems having a feedback loop to the control the valve. These systems are more expensive to manufacture and maintain.

SUMMARY

It is an object of the present invention to provide a simple inexpensive control mechanism for a vehicle heating system that is directly related to heat output of the heat exchanger.

It is a feature of the present invention that the control mechanism is a non-linear potentiometer having an input that is directly proportional to the heat output of the heat exchanger.

A vehicle is provided with an operators cab having a heating system. The vehicle is powered by an internal combustion engine that is a source of heated fluid. Heated fluid from the engine is directed to a supply line where it is carried to a heat exchanger in communication with the interior of the operators cab. A valve having an electrical actuator regulates the flow of heated fluid through the supply line to the heat exchanger. A non-linear potentiometer controls the actuator so that the heat output of the heat exchanger is linear with respect to the operation of the control knob. The non-linear potentiometer drives the actuator so that the valve is opened at an increasing rate until it its fully opened.

In the preferred embodiment the heated fluid is liquid, however the heated fluid could also be a gaseous fluid like air from an air cooled engine. In such a gaseous heated fluid system the valve would be a simple pneumatic damper for regulating the flow of gaseous heated fluid through the supply duct.

DETAILED DESCRIPTION

Figure 1:
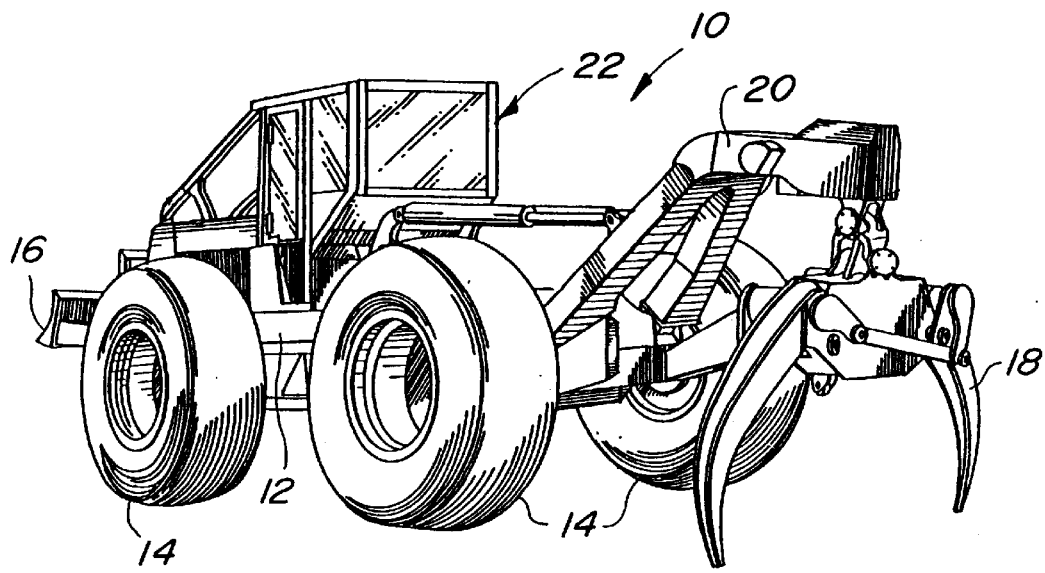
FIG. 1 is a rear view of a grapple skidder work vehicle.
Figure 2:
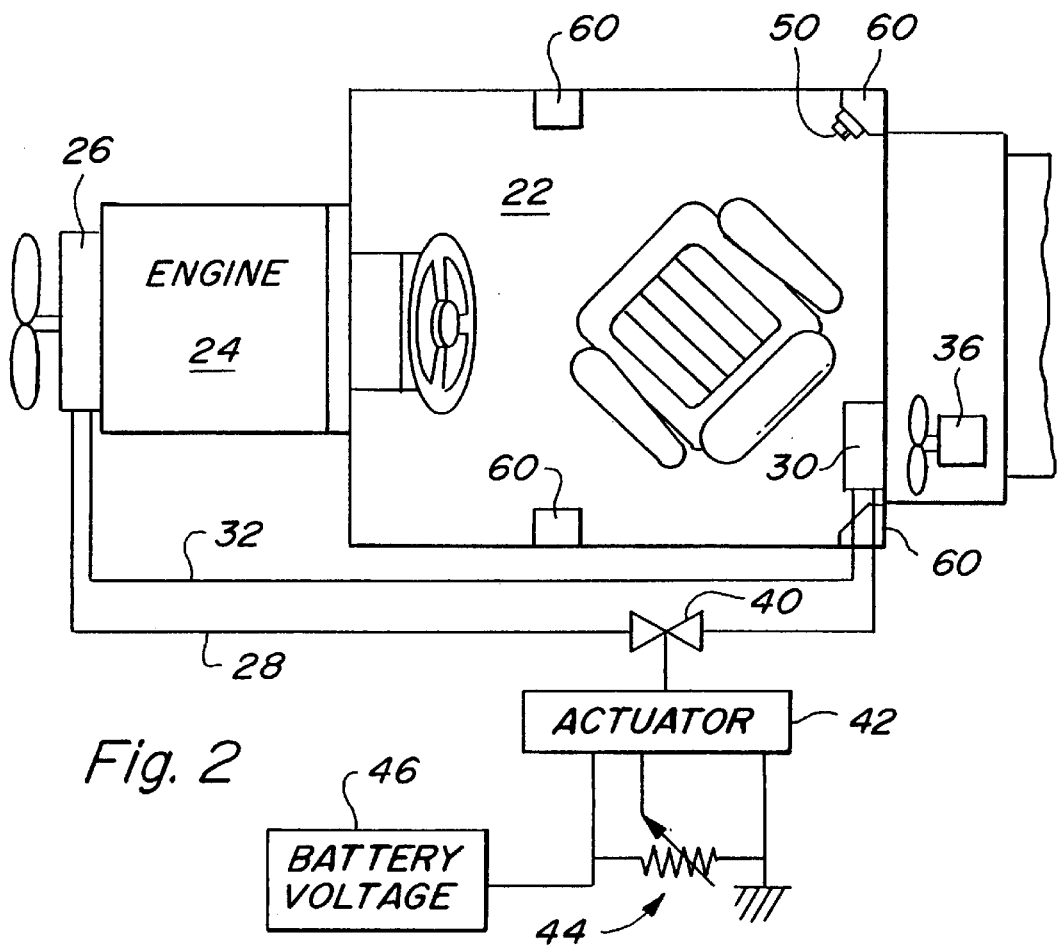
FIG. 2 is an electrical and hydraulic schematic of the heating system for a vehicle.

FIG. 1 illustrates an off road work vehicle which in the present example is a grapple skidder 10. The grapple skidder 10 is provided with a main frame 12 having ground engaging means 14 for supporting and propelling the vehicle. Although the illustrated embodiment discloses a vehicle having ground engaging wheels, the present invention could also be used on track laying vehicles of either the steel tracked type or the rubber tracked type. The skidder 10 is provided with a front mounted bulldozer blade 16, a rear mounted grapple 18 and grapple linkage 20. The operation of the vehicle is controlled from an operator cab 22.

The operation of the skidder is powered by an internal combustion engine 24. The engine is cooled by circulating cooling fluid though the engine block. The heated fluid passes through a reservoir 26 into a supply line 28 where it is directed to heat exchanger 30. The heat exchanger is in thermal communication with the interior of the operators cab 22. Return fluid from the heat exchanger 30 is directed through return line 32 back into the engine 24. The heat from the heat exchanger is circulated into the interior of the cab by a fan 36 which pushes air through the heat exchanger and into the cab.

The flow of heated fluid to the heat exchanger 30 is regulated by a ball valve 40 located in supply line 28. The ball valve 40 regulates the amount of heated fluid supplied to the heat exchanger 30 and thereby the amount of heat energy that can be outputted from the heat exchanger 30. The position of the ball valve 40 is controlled by an electrical actuator 42. In response to a signal from the non-linear potentiometer 44, the actuator 42 moves the valve 40 in a position corresponding to the selected heat output. For example, if no heat is desired by the operator, the operator rotates knob 50 of non-linear potentiometer to its zero position thereby closing the valve 40. If the maximum heat available is desired the operator rotates knob 50 to its eleven position thereby fully opening the valve 40. If an intermediate level of heat is desired the operator rotates knob 50 to one if its intermediate positions, one through ten. The flow of electrical energy from the source of electrical energy 46 to the actuator 42 is controlled by the non-linear potentiometer 44.

Figure 3:
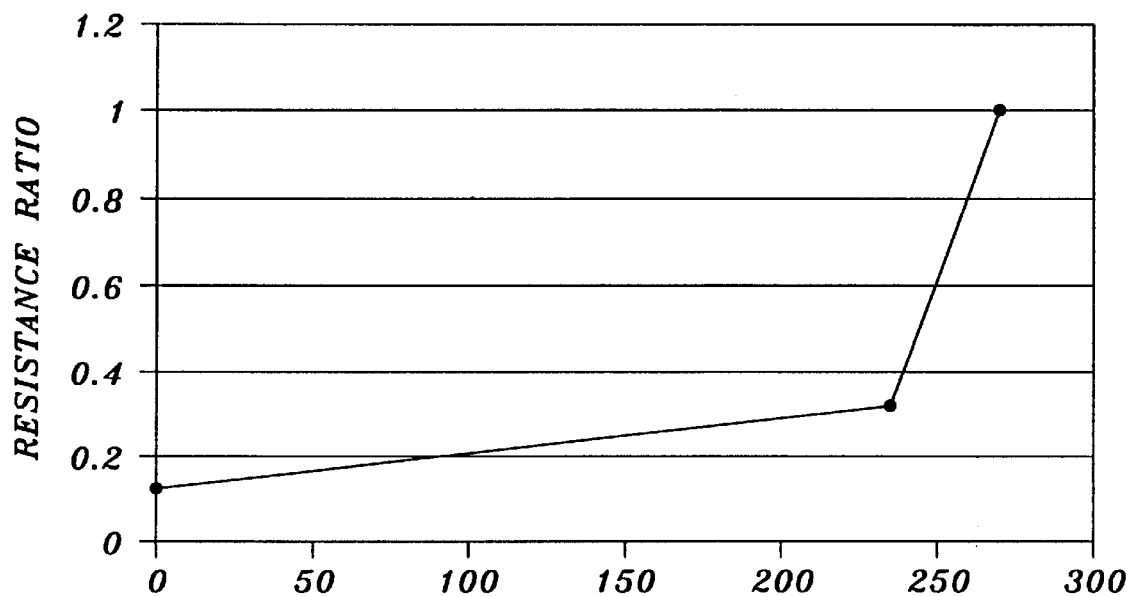
FIG. 3 is a graph indicating the resistance ration of the potentiometer versus knob position.
Figure 4:
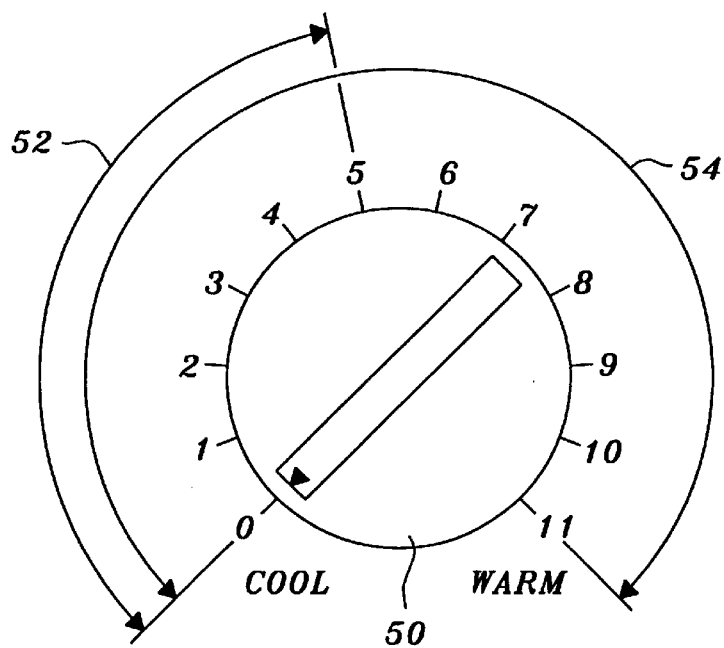
FIG. 4 is a detail view of the potentiometer knob.

The non-linear potentiometer 44 is a rotary potentiometer that can be rotated 270 degrees, see arc 54 in FIG. 4. When the knob 50 is at its zero position the non-linear potentiometer 44 is at zero degrees. At the knob's zero position, the valve 40 is fully closed. When the knob 50 is rotated to its eleven position, the non-linear potentiometer 44 is at 270 degrees. As the knob 50 is rotated from its zero position to its eleven position, the potentiometer 44 is rotated. Rotation of the potentiometer 44 energizes the actuator 42 which opens the valve 40 at an unequal rate. The rate at which valve 40 is opened is approximated by the resistance ratio illustrated in FIG. 3. The valve 40 is closed when the potentiometer is at zero degrees (knob 50 position zero). As the knob 50 is rotated the first 240 degrees of its 270 degree arc the potentiometer 44 is rotated 240 degrees. During this first 240 degrees of rotation of the knob 50 and potentiometer 44, the valve 40 is only slowly opened. As the knob is further rotated from 240 degrees to 270 degrees the valve 40 is opened more rapidly until it is fully opened at the 270 degrees or the eleven position on the knob 50. This differential opening rate provides a linear heat output rate as the knob 50 and potentiometer 44 are rotated.

In older designs using linear potentiometers that open the valve in a linear fashion, the potentiometers can be moved through an arc of 270 degrees, see arc 54 in FIG. 4, but their control range is limited to arc 52 in FIG. 4, as they reach maximum heat output before the valve is half opened. The operation of the actuator 42 and valve 40 are identical to the prior art, except that the control characteristics of the non-linear potentiometer 44 is less sensitive in the first 240 degrees of rotation and more sensitive between 240 degrees of rotation and 270 degrees of rotation.

The operators cab is provided with a roof support structure comprising vertical posts 60. In the preferred embodiment these posts are part of the roll over protection system (ROPS). In a skidder application the operator is constantly looking rearwardly over his or her right shoulder to insure the grapple or choker cable is operating correctly. To that end The operators seat is placed at an angle t the longitudinal centerline of the vehicle to facilitate the operator's visibility. In addition, the heater control knob 50 is mounted on the left rear vertical post so it is readily accessible to the operator.

The invention should not be limited to the above described embodiments, but should be limited solely by the claims that follow.

We claim:

1. A heating system for an operators cab of a vehicle, the heating system comprising:
    a source of heated fluid,
    a heat exchanger in thermal communication with the operators cab;
    a valve located between the source of heated fluid and the heat exchanger, the valve regulating the flow of heated fluid from the source of heated fluid to the heat exchanger;
    an electrical actuator for positioning the valve;
    a non-linear potentiometer is electrically coupled to the actuator for controlling the operation of the actuator and thereby positioning the valve, wherein a source of electrical energy is electrically coupled to the non-linear potentiometer and the non-linear potentiometer controls electricity flow from the source of electrical energy to the actuator.

2. A heating system as defined by claim 1 wherein the source of heated fluid is an internal combustion engine for powering the vehicle.

3. A heating system as defined by claim 2 wherein the non-linear potentiometer has a rotary knob through which an operator controls heat output from the heat exchanger.

4. A heating system as defined by claim 3 wherein the electrical resistance of the non-linear potentiometer increases at an increasing rate as the rotary knob is rotated to its highest settings.

5. An off road work vehicle for performing a work operation, the work vehicle comprising:
    an operators cab;
    an internal combustion engine for powering the vehicle;
    a heat exchanger in thermal communication with the operators cab,
    a fluid supply line extending from the internal combustion engine and the heat exchanger;
    a valve for regulating the flow of fluid through the supply line from the internal combustion engine to the heat exchanger;
    an electrical actuator for positioning the valve;
    a non-linear potentiometer is electrically coupled to the actuator for controlling the operation of the actuator and thereby positioning the valve, wherein a source of electrical energy is electrically coupled to the non-linear potentiometer and the non-linear potentiometer controls electricity flow from the source of electrical energy to the actuator.

6. An off road vehicle as defined by claim 5 wherein the non-linear potentiometer has a rotary knob through which an operator controls heat output from the heat exchanger.

7. An off road vehicle as defined by claim 6 wherein the electrical resistance of the non-linear potentiometer increases at an increasing rate as the rotary knob is rotated to its highest settings.

8. An off road vehicle as defined by claim 7 wherein a return line is positioned between the heat exchanger and the internal combustion engine for returning fluid to the internal combustion engine.

9. An off road vehicle as defined by claim 5 wherein the operators cab is provided with a support structure, the support structure is provided with a left rear corner post and the rotary knob of the non-linear potentiometer is mounted to the left rear corner post.

10. An off road vehicle as defined by claim 9 wherein the left rear corner post is part of a roll over protection system.

* * * * *